Dec. 30, 1969   P. VOLANS ETAL   3,486,674
METHOD AND APPARATUS FOR FIBRILLATION
Filed Jan. 24, 1968   2 Sheets-Sheet 1

INVENTORS
PETER VOLANS
PUSHPKUMAR D. CHANGANI
BY
ATTORNEY

Dec. 30, 1969   P. VOLANS ETAL   3,486,674
METHOD AND APPARATUS FOR FIBRILLATION
Filed Jan. 24, 1968   2 Sheets-Sheet 2

INVENTORS
PETER VOLANS
PUSHPKUMAR D. CHANGANI
BY
*J. Bowen Ross, Jr.*
ATTORNEY

United States Patent Office 3,486,674
Patented Dec. 30, 1969

3,486,674
METHOD AND APPARATUS FOR FIBRILLATION
Peter Volans, Chepstow, and Pushpkumar Dewanmal Changani, Newport, England assignors to Monsanto Chemicals Limited, London, England, a British Company
Filed Jan. 24, 1968, Ser. No. 700,130
Claims priority, application Great Britain, Jan. 30, 1967, 4,486/67
Int. Cl. B26f 3/00, 3/02; B65h 35/00
U.S. Cl. 225—3
10 Claims

ABSTRACT OF THE DISCLOSURE

A linear fibrous mass is produced from a drawn and unidirectionally oriented thermoplastic foamed rod or sheet by subjecting the rod or sheet to a mechanical shearing action whereby the walls of the foam are broken down to form a three dimensional network of interconnecting fiber elements. The apparatus comprises a number of pairs of rotatable apposed pressure rolls arranged so that the thermoplastic material passes through consecutive and successive pairs of rolls. At least one pair of rolls is adapted to reciprocate relative to an adjacent pair of rolls to fibrillate the material.

---

This application relates to an application filed by us on Nov. 6, 1967, having the Ser. No. 680,703.

It has been proposed to subject oriented thermoplastic materials to various forces such that they are split up into fibrous structures. The pertinent prior art includes a process for the production of a novel fiber assembly which comprises drawing an extruded, substantially rigid, foamed thermoplastic material so that it becomes oriented essentially in one direction and subjecting the drawn foam material to forces such that the walls of the foam are broken down and converted into three dimensional structures of interconnected fiber lengths. The prior art further includes the production of a novel textile yarn which comprises drawing a strand or ribbon of an extruded foamed thermoplastic material so that it becomes oriented essentially in the direction of extrusion and subjecting the drawn foamed material to forces such that the walls of the foam are broken down and converted into a three dimensional structure of interconnected fiber elements.

The process of breaking down the drawn material into a fibrous structure is denoted by the term "fibrillation" and the present invention is concerned with a novel apparatus and process for carrying out the fibrillation step.

The apparatus of this invention for fibrillating an oriented extruded foamed thermoplastic material which may be in the shape of a strand or ribbon comprises a number of pairs of rotatable opposed pressure rolls arranged with their axes substantially parallel so that an oriented extruded foamed thermoplastic material can pass through consecutive and successive pairs of rolls. The direction of orientation is transverse with respect to the axes of the rolls. At least one pair of rolls is adapted to reciprocate relative to an adjacent pair of rolls in a direction having a component parallel to the roll axes so as to bring about fibrillation of the oriented foamed material passing through the rolls.

The invention also comprises a process for the production of a fibrous material which comprises passing an oriented extruded foamed thermoplastic material through successive pairs of rotatable opposed pressure rolls arranged with their axes substantially parallel and transverse to the direction of orientation of the material and reciprocating at least one pair of rolls relative to an adjacent pair in the direction having a component parallel to the roll axes so as to bring about fibrillation of the oriented foamed material.

Preferably, the rolls are freely rotatable and the extruded foamed thermoplastic material is pulled through them; however, some or all of the rolls may be driven if desired. As previously stated, the direction of the reciprocatory motion is parallel to the roll axes. It is not necessary for the reciprocating rolls to move in a direction other than that being parallel to the roll axes. In actuality, the best uniformity of fibrillation is generally obtained if the reciprocatory motion is imported to alternate pairs of rolls so that a high degree of shearing stress is imparted to the oriented extruded foam thermoplastic material.

Therefore, an object of this invention is to provide a process for fibrillating extruded and drawn foamed thermoplastic material to produce a three dimensional network of interconnected fiber elements.

Another object of this invention is to provide an apparatus for fibrillating extruded foamed thermoplastic materials by means of a lateral shearing action.

A further object of this invention is to provide an apparatus for fibrillating drawn and extruded foamed thermoplastic materials with at least one pair of rolls which reciprocate relative to an adjacent pair of rolls in a direction being in axial alignment with the axes of the rolls.

These and other objects will become apparent upon the reading of the description and claims in conjunction with the drawings, in which:

Figure 1:
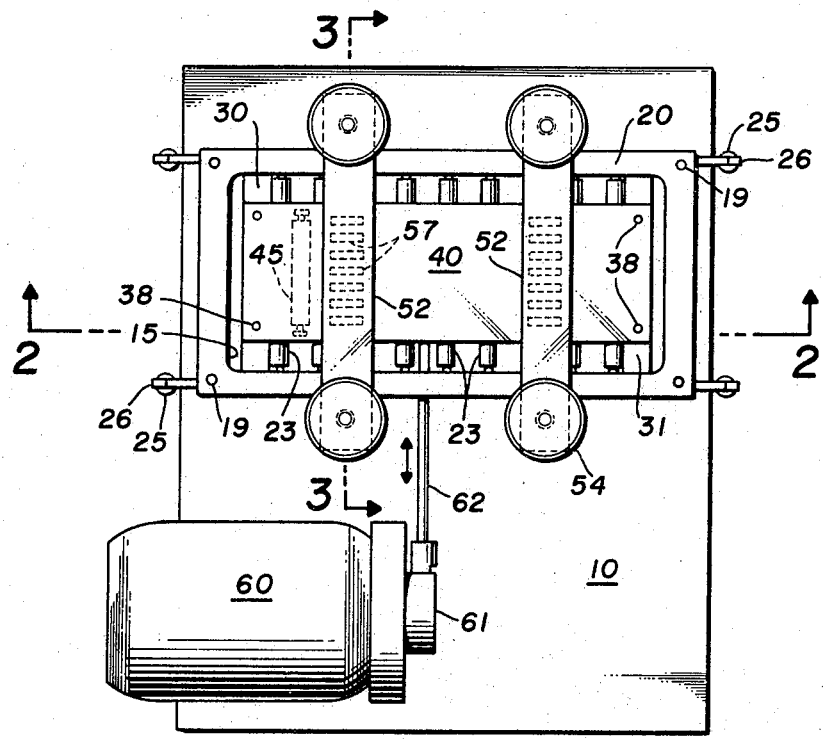
FIGURE 1 is a plan view of the apparatus showing the stationary needle rolls, the upper stationary platform and the upper reciprocating platform.

The apparatus is mounted on flat plate 10 and is supported by parallel base members 11 and 12 which are rigidly secured to flat plate 10 and which extend vertically upwardly from the same. Lower stationary platform 14 is securely mounted onto the top of base members 11 and 12. Stationary platform 14 is provided with an opening 15 in which other portions of this apparatus reside. Lower stationary platform 14 which includes two elongated opposed sides is provided with a plurality of bearings 17 which are mounted in facing alignment across opening 15 along the sides of stationary platform 14. Each bearing 17 along one side of stationary platform 14 faces a counterpart bearing on the opposite side of platform 14, the two of which are adapted to receive a needle roll 18 which is journaled therein.

Stationary platform 14 is provided with a plurality of vertically extending and rigidly mounted pins 19 which are located at the corners of stationary platform 14. Upper stationary platform 20 is slidably mounted on pins 19 and like lower platform 14, is provided with a plurality of bearings 22 which are positioned vertically above corresponding bearings on lower stationary platform 14. Upper bearings 22 rotatably receive upper needle rolls 23 so that upon the lowering of upper stationary platform 20, upper needle rolls 23 contact lower needle rolls 18. When a foamed strand or ribbon is drawn through the rolls 22 and 18, rolls 22 and 18 separate a distance and in order to secure the strand when passing between the two rolls to prevent a laterial movement, tension springs 25 are provided. Tension springs 25 are vertically arranged and are secured to upper stakes 26 and lower stakes 27 which extend outwardly from base members 11 and 12 and from upper stationary platform 20, respectively.

Base members 11 and 12 support and have extending therebetween bearing plates 30 and 31. Bearing plates 30 and 31 slidably mount lower reciprocable platform 34 which is adapted to reciprocate in parallel with respect to the axial alignment of the rolls and laterally with respect to the yarn path through the apparatus. Lower reciprocable platform 34 is provided with a plurality of bearings 35 which are disposed around the periphery thereof similarly to the disposition of bearings 17. Bearings 35 are spaced inwardly with respect to bearings 17; however, they are alternately spaced with respect to bearings 17 so that a roller mounted by bearings 35 is positioned in between rolls mounted by bearings 17. Lower reciprocable platform 34 is provided with a plurality of upwardly extending aligning rods 38 which are preferably located at the corners thereof. Aligning rods 38 slidably receive upper reciprocable platform 40 and position it vertically above lower reciprocable platform 34. Upper reciprocable platform 40 is provided with a plurality of bearings 42 which are spaced vertically above bearings 35. Bearings 35 and 42 respectively receive needle rolls 44 and 45 with needle rolls 44 and 45 being journaled for rotation therein. By the proper alignment of bearings 42 with bearings 35, needle rolls 45 are in axial vertical alignment with needle rolls 44 and normally engage needle rolls 44 except when being separated by a fiber or ribbon.

In order to exert the proper compressive force by rolls 45 on rolls 44, spring means 48 are provided. Spring means 48 are comprised of vertically arranged shafts 49 which extend upwardly from lower stationary platform 14 and through the respective bearing plate 52. The upper portions of shafts 49 are threaded to receive nob 54 which is adapted to travel vertically thereon. Bearing plates 52 extend laterally across upper reciprocable platform 40 and are adapted to slide vertically on shafts 49. Springs 55 are coiled around the upper portions of shafts 49 between bearing plates 52 and nob 54 so as to exert a force upon reciprocable platform 40. Bearing plates 52 are provided with spacers 57 which provide a smooth surface upon which upper reciprocable platform 40 may slide and which space bearing plate 52 above and out of contact with upper stationary platform 20. The compression force between rolls 44 and 45 is determined by the position of nobs 54 and the force may be varied accordingly by the raising and lowering thereof.

Motor 60 is mounted on base 10 to the side of the apparatus and is connected to bottom reciprocable platform 34 by means of eccentric mechanism 61 and transmission rod 62. Preferably, motor 60 is electrically operated and has a variable throw and a variable motor speed.

Figure 4:
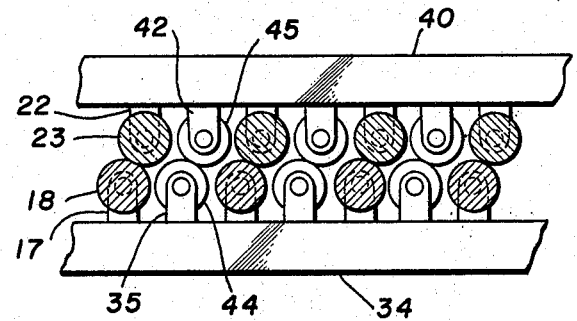
FIGURE 4 is an alternate embodiment of the location of the upper needle rolls relative to the lower needle rolls.

In reference to FIGURE 4, rolls 45 and 23 which are respectively connected to upper stationary platform 20 and upper reciprocatory platform 40 may be slightly offset with respect to needle rolls 44 and 18 so as to impart to the fiber a vertical as well as a horizontal shearing action.

In operation, a strand of oriented, substantially rigid, extruded foam resin material is pulled through the successive pairs of needle rolls. Needle rolls 44 and 45 which are respectively connected to lower reciprocable platform 34 and upper reciprocable platform 40 are set in reciprocatory motion by means of the eccentric mechanism 61 upon the energization of motor 60. As the strand is pulled through the respective rolls, it is repeatedly flexed in shear such that the walls of the foam are broken down and converted into a three dimensional structure of interconnected fiber elements. Using the staggered roll configuration as shown in FIGURE 4, a degree of rubbing between the fixed and reciprocal rolls results which aids in the breaking down of the cell walls.

The diameter of the rolls can for instance be between about 0.05 and 0.5 inch, preferably between 0.1 and 0.3 inch such as for example about 0.2 inch. The rolls are preferably roughened to give them a firmer grip on the strand. The tension or compression in each of springs 55 and 25 can be up to 10 pounds in weight, but is preferably between 2 and 5 pounds weight for example about 3 pounds weight.

The amplitude and frequency of reciprocatory motion of rolls 44 and 45 can be chosen from between wide limits. Thus, the amplitude can for instance be from 0.1 to 0.5 inch but it is usually between 0.2 and 0.3 inch, for example 0.2 inch. The frequency is often in the range 0 to 50 cycles per second, particularly from 10 to 25 cycles per second, such as for example about 20 cycles per second.

The rate at which the oriented foamed material is passed through the rolls is dependent on the degree of fibrillation required and on the frequency of reciprocation, but often it is between 1 and 100 feet per minute particularly between 5 and 30 feet per minute, such as for example about 15 feet per minute.

The process and apparatus of the present invention are of particular value in producing the fibre assemblies described in U.S. patent application Ser. No. 468,269. The thermoplastic material is one capable of being formed into an extruded foam; it is in practice usually a synthetic material and one that is fibre-forming. Excellent results are obtained with a thermoplastic synthetic material, for example a polymer or copolymer obtained by polymerization (which includes copolymerization) of an ethylenically unsaturated monomer. Such a monomer can be an ethylenically unsaturated hydrocarbon, but it can be for instance a nitrile, such as acrylonitrile or methacrylonitrile; vinyl or vinylidene chloride; a vinyl ester, such as vinyl acetate; or an acrylate ester, such as ethyl acrylate or methyl methacrylate. Where the monomer is a hydrocarbon this can be a mono-olefin, a diene, or a vinyl-substituted benzene, for instance ethylene, propylene, a butylene, a pentene or a hexene; butadiene; or a vinyl-substituted benzene, such as styrene or α-methylstyrene. For example, the polymer can be polyethylene (low density or high density material, crystalline polypropylene, or polystyrene or a toughened polystyrene. A copolymer can in general be for instance one involving two or more (such as three) of any of the monomers referred to above. A comonomer can for instance be one of a type which will impart a degree of flame-retardance to the copolymer, and an example of such a substance is a vinyl halide, such as vinyl chloride, vinyl bromide or a vinylidene chloride. Example of other comonomers are vinylpyrollidone and a vinylpyridine such as methylvinylpyridine. A copolymer can for example be one derived from two hydrocarbon monomers, such as an ethylene-propylene or styrene-butadiene copolymer; or a hydrocarbon and a different type of monomer, such as an ethylenevinyl acetate copolymer; or a copolymer derived from dissimilar monomers such as for example acrylonitrile and a minor proportion of vinyl acetate. The thermoplastic material can also consist of a mixture of two or more polymers or copolymers; it can for example comprise a mixture of a copolymer of acrylonitrile with a minor amount of vinyl acetate (in the region for instance of 10% by weight) and polyvinyl chloride; or a mixture of an acrylonitrile-vinyl acetate copolymer and a copolymer of acrylonitrile with methylvinylpyridene.

Preferably the polymer is a thermoplastic resin material but it can be an elastomeric material, for instance a copolymer derived from sufficient of a diene monomer (such as butadiene) to impart some degree of elastomeric properties to the copolymer; natural rubber; or a synthetic rubber such as for instance a polybutadiene, styrene-butadiene or acryonitrile-butadiene rubber. A thermoplastic resin material can be non-crystalline (as in amorphous polystyrene) or crystalline (as in crystalline polyethylene or polypropylene). Other types of synthetic materials that can be employed include polyamides, such as for example nylon 11 and nylon 66; polyurethanes; polylactams, such as a polycaprolactam; and polyesters, such as of the polyethylene terephthalate type. Where the thermoplastic material is regenerated natural fibre it is preferably one based on cellulose, for example rayon, cellulose acetate, cellulose triacetate or cellulose acetate-butyrate.

The extruded foamed polymeric material can, if desired, be produced by conventional extrusion techniques. Where an extruded foamed sheet or board is employed, this can vary in width through a broad range, but normally it will be at least 3 or 4 cells "thick," and probably there will be at least 10 cells measured through the thickness of a sheet. In practice the thickness can for instance be between 0.05 and 2 inches, for instance between 0.1 and 1 inch. A useful range is often from 0.2 to 0.5 inch. The density of the foamed material can for instance be between 1 pound and 10 pounds or more per cubic foot, such as from about 2 to 4 or 5 pounds per cubic foot. The fact that the starting material is foamed can also be expressed in terms of the volume fraction voids that it contains, and this can be as low as 0.5. However, in practice the volume fraction of voids is often not less than 0.9, so that the range can for instance be from 0.95 to 0.985, for instance from 0.96 or 0.97 to 0.98. A volume fraction of voids is equal to a ratio of the volume of voids over the total volume of thermoplastic material and voids.

In general, in the production of the extruded foamed thermoplastic material, the blowing agent will be a low boiling substance or a chemical blowing agent. The foamed material usually contains closed cells, although material (for instance polyethylene) can be employed which contains cells which to some extent are interconnecting or "open." In many instances the agent is a volatile substance, and is often one that is a gas or vapour under normal atmospheric conditions (such as 20° C. and 1 atmosphere pressure), but which while under pressure before extrusion will be present in solution in the molten or semi-molten thermoplastic material. The blowing agent can, however, be one, such as pentane or a pentane fraction, which is a volatile liquid under normal conditions. Examples of volatile substances that can be used include lower aliphatic hydrocarbons, such as methane, ethane, ethylene, propane, a butane, or a pentane; low alkyl halides, such as methyl chloride trichloromethane or 1,2-dichlorotetrafluoroethane; acetone; and inorganic gases, such as carbon dioxide or nitrogen. The lower aliphatic hydrocarbons, especially butane, are useful in respect of polyolefinic materials, such as polystyrene and polyethylene. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30% especially 7 to 20%, by weight based on the weight of the thermoplastic material is often a suitable proportion of blowing agent, and for example the use of from 7 to 15% by weight of butane in conjunction with a polyolefinic material has given excellent results. Sometimes the blowing agent will be employed in conjunction with a nucleating agent, which assists in the formation of a large number of small cells. A wide range of nucleating agents can be employed, including finely-divided inert solids such as for example silica or alumina, perhaps in conjunction with zinc stearate, or small quantities of a substance that decomposes at the extrusion temperature to give a gas can be used. An example of the latter class of nucleating agents is sodium bicarbonate, used if desired, in conjunction with a weak acid such as for example tartaric acid or citric acid. A small proportion of the nucleating agent for example up to 5% by weight of the thermoplastic material, is usually effective. A plasticizer can also be present where this is appropriate.

The extruded foamed resin can be used in the form of a sheet or board, in which case it will often have been made using a slit die; sheet material can also be produced using an annular die by extrusion of a tube of foamed material, which can either be slit longitudinally and opened out into a sheet or collapsed so as to form a sheet of double thickness.

The extruded foamed thermoplastic material is drawn and in doing so, it is orientated unidirectionally and the cells of the foam are elongated. In practice, it is convenient to draw the foam along the direction in which it has been extruded (that is to say it is drawn uniaxially), but if desired, appropriate arrangements can be made for the foamed material to be drawn in a direction for example at right angles to the direction of extrusion. The drawn material usually has a slightly higher density than the material before drawing.

The precise conditions that are necessary in the drawing operation to achieve the required results depend on the particular thermoplastic material that is employed but, in general, draw-down ratios of from 20:1 to 2:1 have been found useful, for example from 15:1 to 3:1. Good results have been obtained with a ratio between 12:1 and 5:1, for instance from 10:1 to 7:1. The temperature employed again depends on the particular thermoplastic material, but it is an elevated one in most instances, for example above 40° C. or 50° C. and up to 130° C. or 140° C. or rather more in some cases. A temperature in the range of 80° C. to 100° C., such as about 90° C., is often useful. In principle it is desirable for the foamed material to be heated to a moderately elevated temperature, not high enough to damage the foam structure but high enough for the material to be sufficiently ductile. For instance, extruded foamed polystyrene can be drawn at from 120° C. to 140° C. while for foamed high density polyethylene a temperature between 40° C. and 100° C. is preferable. An amorphous thermoplastic material should normally be drawn above its glass transition temperature, whilst a crystalline thermoplastic material can be drawn at a temperature lower than its crystalline melting point. If the foamed material is still hot from the extrusion operation, it may need to be cooled before it is possible to draw it in a subsequent operation but in the more normal course of events, a foamed material needs to be heated to a suitable temperature before it can be drawn because, for example, even in a continuous operation the temperature of the foamed material can have dropped too low by the time it is possible to draw it. The heat treatment that is applied is as had been explained such that the extruded foam is sufficiently ductile to be drawn, and this can involve for instance either heating the foamed material at a steady temperature or subjecting it to a relatively high temperature (perhaps as high as 200° C.) for a short time followed by a period (normally longer) at a lower temperature. For example a foamed material that is produced in a form which has an outer "skin" of material (which has a higher density than the inner material) may give better results with a heat treatment which involves a short initial period at a higher temperature. This initial treatment can be useful in the instance of a thermoplastic material such as crystalline polypropylene, and can be as short as a few seconds. The precise conditions necessary in order to ensure that a foamed material is in a condition suitable for drawing can easily be found by simple experiments. In general, any convenient method of applying heat can be employed. For example the extruded foamed material can be passed through hot air or some inert gas or through a heated bath of a suitable inert liquid, such as water, glycerol or ethylene glycol. In certain instances, the drawing can be performed at room temperatures, for example with nylon materials.

After the drawing operation the material is fibrillated in the way described above, and the finished product can then be used in a variety of applications depending principally on its major dimensions and the extent to which it has been fibrillated. Thus, many of the product materials in the form of sheets of fibre assemblies can be used as nonwoven fabrics; these have in general excellent flexibility and are capable of being draped over an article or surface. If, for example, a sheet of fibre assembly is placed over an object such as a sphere, it adheres relatively closely to the outline of the object. Other products can be produced, for example, in the form of yarns that can be woven or converted into rope, nets or other articles in the traditional way.

The process of the invention is illustrated by the following example.

EXAMPLE

This example describes the production of a fibrillated strand of polypropylene by a process according to the invention.

Figure 2:
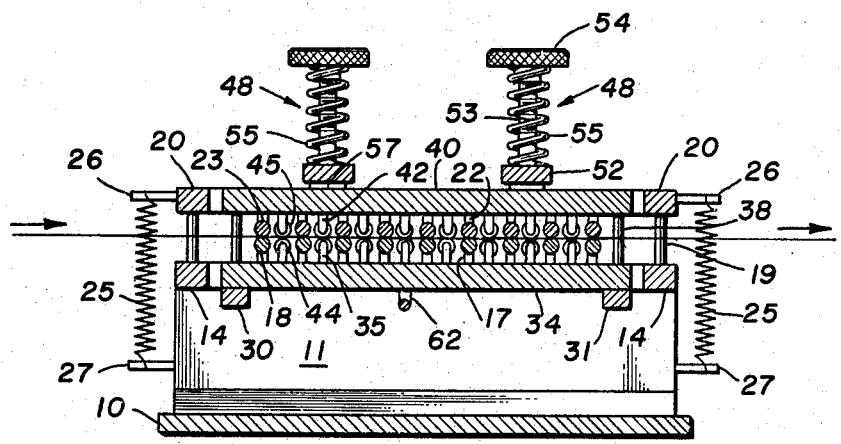
FIGURE 2 is a section view taken along lines 2—2 of FIGURE 1 showing the various spring members for compressing the upper needle rolls against the bottom needle rolls.
Figure 3:
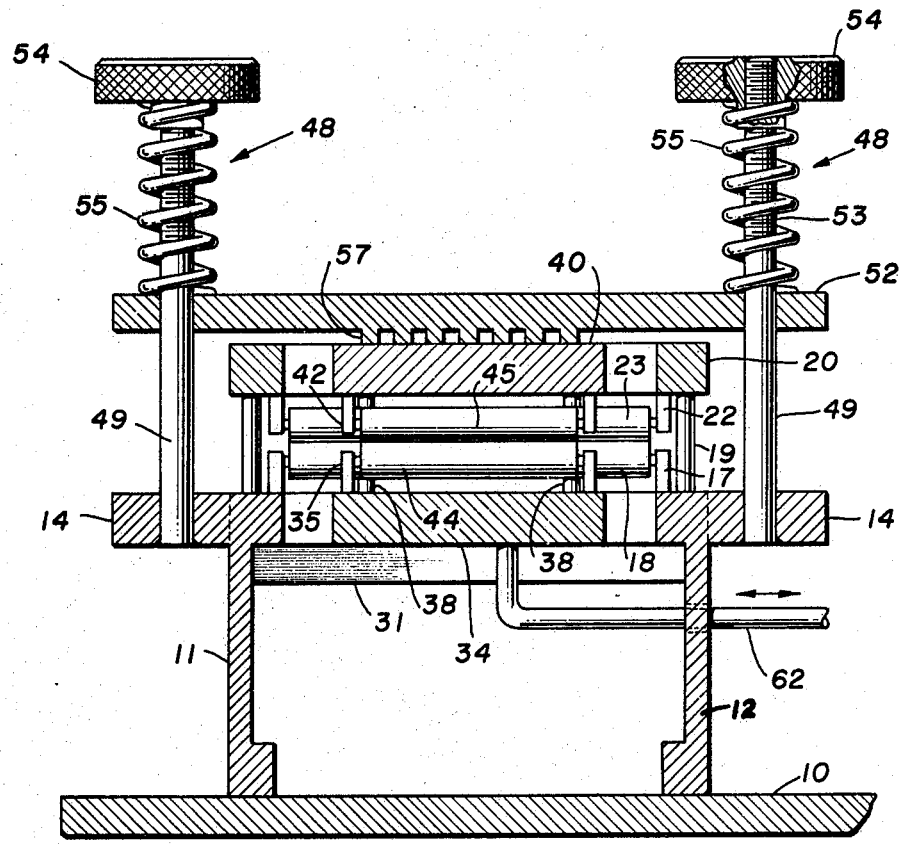
FIGURE 3 is a section view taken along lines 3—3 of FIGURE 1 showing the reciprocating and stationary platforms mounting their respective needle rolls.

An apparatus similar to that shown in FIGURES 1 and 2 of the drawings was used with the rolls in a staggered configuration as shown in FIGURE 4. All the rolls had a diameter of 0.187 inch, the fixed rolls being 2¼ inches long and the reciprocable rolls being 1 inch long. The reciprocable rolls were set in reciprocatory motion with an amplitude of 0.2 inch and a frequency of 20 cycles per second, and a strand of orientated foamed polypropylene having a diameter of ⅛ inch and a draw down ratio of 6.8 to 1 was pulled through the rolls at the rate of 12 feet per minute. There was produced a fibrillated polyproplene yarn having soft silky texture and a tensile strength of 1.5 grams per denier.

What we claim is:

1. An apparatus for fibrillating an oriented extruded, substantially rigid, cellular foamed thermoplastic material comprising a plurality of rotatable pressure rolls having parallel axes and arranged in cooperating pairs, said foamed material being passed successively through said pairs in a direction being transverse to said roll axes and being prevented from moving in said axial direction by said cooperating pairs, at least one of said pairs being reciprocable relative to an adjacent pair in said axial direction to fibrillate said foamed material whereby said cellular structure is broken down to form a three-dimensional network of interconnected fiber elements.

2. The apparatus of claim 1 wherein said rolls are freely rotatable to adapt said foamed material to be pulled through said pairs of rolls.

3. The apparatus of claim 2 wherein alternate pairs of rolls are reciprocable in the axial direction relative to the adjacent pairs of rolls.

4. The apparatus of claim 3 wherein each pair of said rolls is comprised of an upper and a lower roll, said upper roll is each of said pairs residing in a common horizontal plane and said lower roll in each of said pairs residing in a common horizontal plane with said horizontal plane in which said upper rolls reside and said horizontal plane in which said lower rolls reside being parallel to each other.

5. The apparatus of claim 4 wherein the axis of said upper roll in each of said pairs is positioned to one side of the vertical plane extending upwardly from the axis of said lower roll.

6. The apparatus of claim 5 wherein the exterior surface of said rolls are roughened to enable said pairs of rolls to more securely grasp said foamed material.

7. A process for the production of a fibrous material comprising the steps of passing an oriented extruded, substantially rigid, cellular foamed thermoplastic material through successive pairs of pressure rolls, said rolls having axes being parallel to each other and transverse with respect to the orientation of said foamed material, and reciprocating at least one pair of rolls relative to an adjacent pair in said axial direction to fibrillate said foamed material whereby said cellular structure is broken down to form a three-dimensional network of interconnected fiber elements.

8. The process of claim 7 wherein the frequency of the reciprocatory motion is at least 10 cycles per second.

9. The process of claim 8 wherein said foamed material is passed through said pairs of rolls at a speed which is greater than 5 feet per minute.

10. The process of claim 9 wherein the amplitude of the reciprocatory motion is less than 0.3 inch.

References Cited

UNITED STATES PATENTS 3,395,525   8/1968   Eddy.

JAMES M. MEISTER, Primary Examiner

U.S. Cl. X.R.

225—97; 264—147; 28—1